(12) United States Patent
Shark et al.

(10) Patent No.: US 7,775,955 B1
(45) Date of Patent: Aug. 17, 2010

(54) CUTTING TOOL REMOVAL AND INSTALLATION ASSIST DEVICE

(75) Inventors: Steve Shark, Wapakoneta, OH (US); Brad Bergman, Yorkshire, OH (US); Ryan M. Johnson, Anna, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/264,559

(22) Filed: Nov. 4, 2008

(51) Int. Cl.
*B23Q 3/157* (2006.01)
(52) U.S. Cl. .......................................... 483/53; 483/51
(58) Field of Classification Search .................... 483/51, 483/53, 30, 31, 36, 58, 59, 60, 61, 65, 66
See application file for complete search history.

(56) References Cited

U.S. PATENT DOCUMENTS

| | | | |
|---|---|---|---|
| 2,952,170 A | | 9/1960 | Hansen et al. |
| 3,431,635 A | * | 3/1969 | Balding ........................ 483/51 |
| 4,609,326 A | * | 9/1986 | Roesler ....................... 483/902 |
| 6,527,686 B1 | * | 3/2003 | Houser et al. ................... 483/1 |
| 6,685,608 B2 | | 2/2004 | Menzio |
| 6,802,801 B2 | | 10/2004 | Lasch |

* cited by examiner

*Primary Examiner*—Erica E Cadugan
(74) *Attorney, Agent, or Firm*—Rankin, Hill & Clark LLP

(57) ABSTRACT

A cutting tool changing device to remove and reinstall a cutting tool in a tool magazine in a machine center is provided. The cutting tool changing device includes a mounting frame and a tool changing jig that slides in a horizontal forward and backward direction along the mounting frame. The tool changing jig includes a support platform mounted to the mounting frame, a lifting assembly mounted to the support platform, a lifting platform mounted to the lifting assembly, and a tool clamping assembly mounted to the lifting platform. The lifting assembly moves the tool clamping assembly in a vertical direction to remove and replace the cutting tool.

17 Claims, 6 Drawing Sheets

CUTTING TOOL REMOVAL AND INSTALLATION ASSIST DEVICE

BACKGROUND OF THE INVENTION

1. Field of the Invention

The present invention relates to a machining center and more specifically to a machining center with a mill cutting tool and a mill cutting tool changing apparatus to assist the operator in changing the mill cutting tool.

2. Description of Related Art

Typically a cutting tool in a machining center is periodically replaced due to normal wear and tear. The process of changing out the cutting tool is typically a difficult task because this task is manually performed by the operator without the assistance of a tool changing device.

In some machining centers a typical cutting tool, which may weigh upwards of 40-50 pounds, is mounted to a tool magazine located inside the machining center. The tool magazine is set back between 20-30 inches from the front opening of the machining center. Thus, in order to change out the cutting tool, the operator must physically bend over and reach into the machining center and try to balance a 40 pound weight approximately 30 inches away and then re-install a new cutting tool. In most cases, two people are required to change out the cutting tool.

Thus, there is a need for a device to assist an operator in removing and installing a cutting tool.

SUMMARY OF THE INVENTION

In accordance with one aspect, the present invention overcomes the above mentioned disadvantages by providing a tool changing device that includes a mounting frame, a support platform slidably mounted to the mounting frame, a lifting device mounted to the support platform, and a tool clamping assembly operatively mounted to the lifting device such that the lifting device moves the tool clamping assembly vertically upward and downward. The tool clamping assembly includes a V-shaped nesting block assembly, a pair of vertical support columns, and a clamp arm pivotally attached to a front side of each vertical support column, the clamp arm including a holder to hold and secure the tool in the V-shaped nesting block assembly.

In accordance with another aspect, the present invention provides a cutting tool changing device for removing and reinstalling a cutting tool from a tool magazine in a machine center. The cutting tool changing device includes a mounting frame operatively attached to side walls inside the machine center and a tool changing jig slidably mounted to the mounting frame. The tool changing jig includes a lifting assembly, and a cutting tool clamping assembly operatively mounted to the lifting assembly such that the lifting assembly moves the tool clamping assembly vertically upward and downward. The tool clamping assembly includes a V-shaped nesting block assembly, a pair of vertical support columns, and a clamp arm pivotally attached to a front side of each vertical support column. The clamp arm has a holder to hold and secure the tool in the V-shaped nesting block assembly. The tool changing jig horizontally slides in a forward direction toward the tool magazine and in a backward direction away from the tool magazine to a retracted position.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
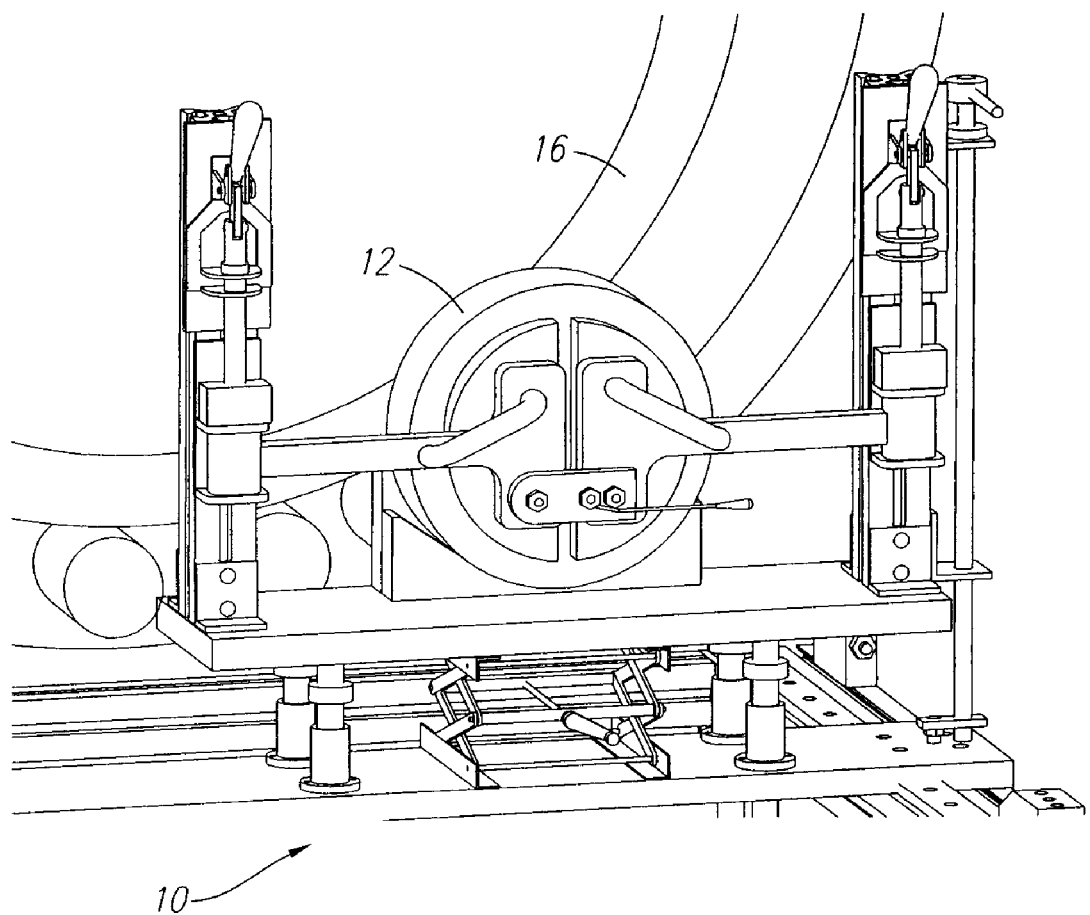
FIG. 1 is a view of a cutting tool changing device positioned inside a machining center.

Referring now to the drawings, FIG. 1 shows a front view of a cutting tool changing device 10 positioned in a machining center such as a CNC machine that performs various milling and brushing functions. As explained above, the cutting tool changing device 10 is designed to assist the operator of the machine center in changing out a cutting tool 12 due to normal usage. The cutting tool 12 includes a shaft 14 and is stored in a tool magazine 16 inside the machining center, and as will become evident from the description below, the cutting tool changing device 10 overcomes the above mentioned disadvantages.

Figure 2A:
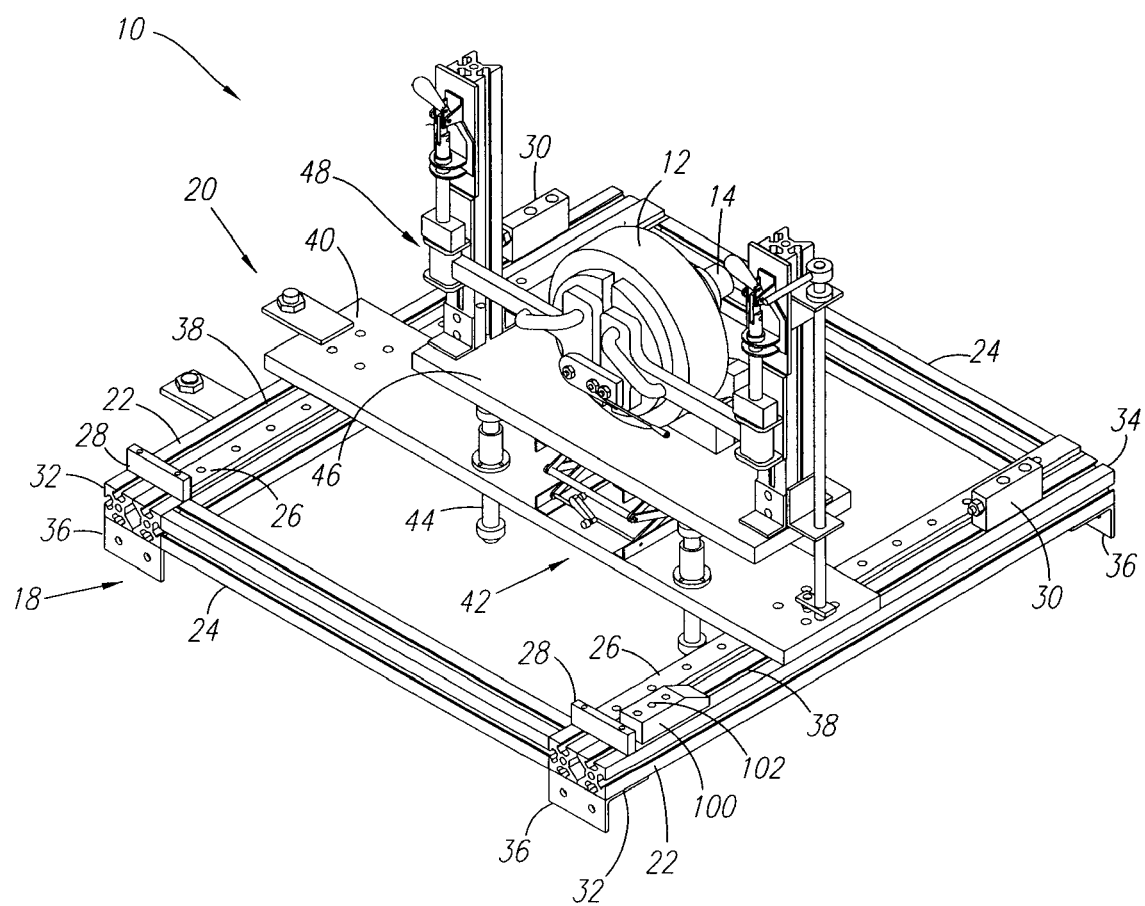
FIG. 2A is a front perspective view of a cutting tool changing device with a pair of clamps arms in a closed position.

Referring to FIG. 2A, the cutting tool changing device 10 includes a mounting frame assembly 18 and a slidable tool changing jig 20 (hereinafter "jig 20").

The mounting frame assembly 18 includes a pair of main supports 22, a pair of cross supports 24 a pair of guide rails 26, a pair of front positive stops 28, and a pair of rear positive stops 30. One cross support 24 is joined to an inside portion near a front portion 32 of each main support 22 and the other cross support 24 is joined to the inside portion near a rear portion 34 of each main support 22. Thus, the main supports 22 and the cross supports 24 are substantially perpendicular to each other thereby forming a rectangular shape. Each main support 22 includes a pair of mounting feet 36, one that extends vertically downward from the front portion 32 of the main support 22 and one that extends vertically downward from the rear portion 34 of the main support 22. Thus, the mounting frame assembly 18 is removably mounted to side walls inside the machining center via the mounting feet 36.

One guide rail 26 is attached to a top surface 38 of each main support 22. The guide rails 26 extend from the front portion 32 of the main support 22 to the rear portion 34 of the main support 22. The jig 20 slides horizontally forward and backwards along the guide rails 26, as will be explained further below.

The front 28 and rear 30 positive stops are removably and slidably attached to the top surface 38 of each main support 22. The front positive stops 28 are located near the front portion 32 of each main support 22 and the rear positive stops 30 are located near the rear portion 34 of each main support 22. The positive stops 28, 30 limit the horizontal forward and backward motion of the jig 20. The front 28 and rear 30 positive stops are secured to the top surface 38 of each main support 22 with a tightening device, such as a set screw. Thus, each positive stop 28, 30 can be moved to any location on the main supports 22 to accommodate multiple applications.

The jig 20 includes a support platform 40, a lifting assembly 42 mounted to the support platform 40, multiple guide columns 44, a lifting platform 46 mounted to the lifting assembly 42, and a cutting tool clamping assembly 48 mounted to the lifting platform 46.

Figure 2B:
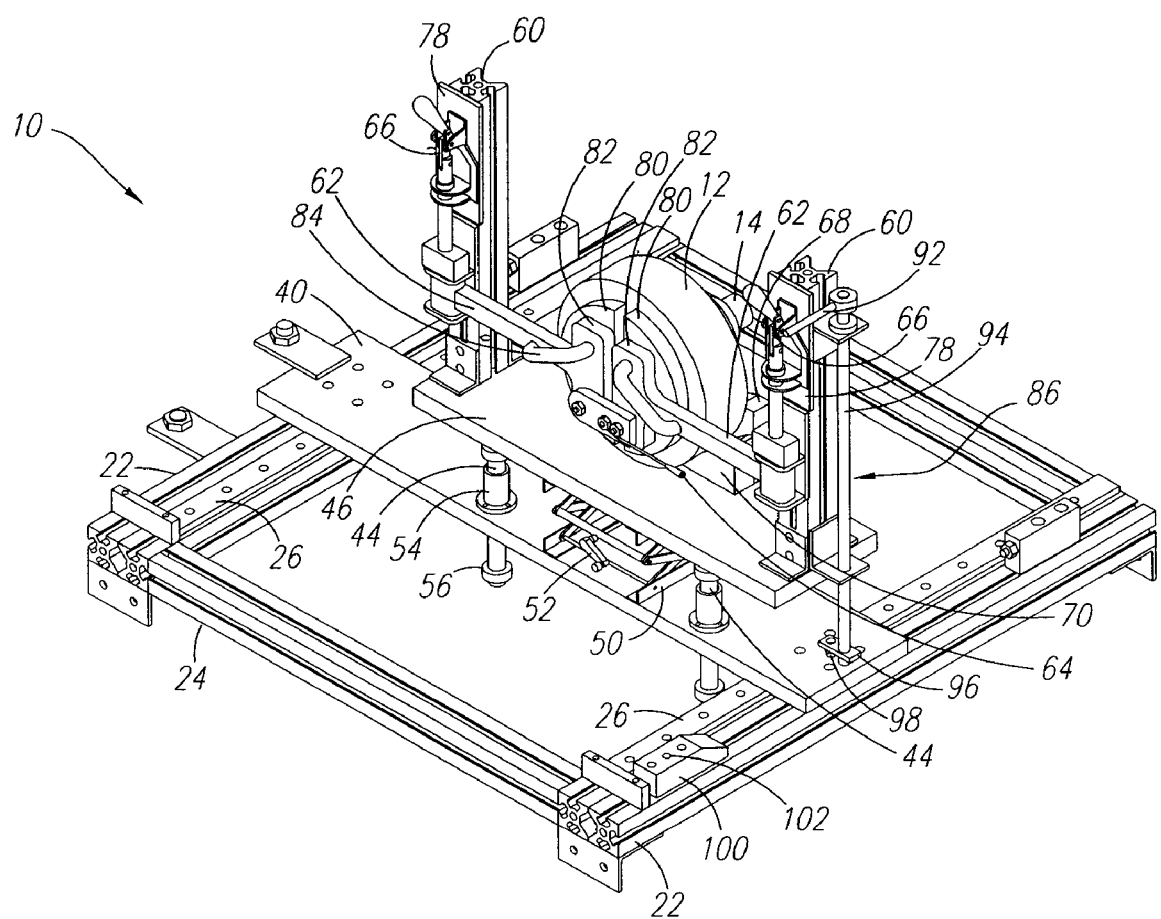
FIG. 2B is the same front perspective view of the cutting tool changing device as FIG. 2A but has been added for simplicity.

Referring to FIG. 2B, the support platform 40 is rectangular in shape and extends between the two main supports 22 such that the support platform 40 contacts a top surface of each guide rail 26. The support platform 40 is attached to the guide rails 26 with an attachment means such that the support platform 40 horizontally slides in a forward and backward direction along the guide rails 26.

The lifting assembly 42 includes a lifting device 50 and a crank handle 52. The lifting device 50 is attached to a bottom side of the lifting platform 46 and may be any type of mechanical lifting device commonly know in the art such as, but not limited to, a jack such as a scissor jack, a screw type jack, etc. The crank handle 52 attaches to a front of the lifting device 50 and upon rotation of the crank handle 52 the lifting device 50 moves vertically in an upward and downward direction. Thus, the lifting assembly 42 moves the lifting platform 46 and the cutting tool clamping assembly 48 vertically in an upward and downward direction.

The multiple guide columns 44 are attached to the bottom surface of the lifting platform 46 and extend downward through guide column openings defined in the support platform 40. Reinforcing collars 54 are attached to the support platform 40 around each guide column opening to provide additional support for the guide columns 44. When the lifting device 50 is actuated to move the lifting platform 46 and the cutting tool clamping assembly 48 in the upward and downward directions, the guide columns 44 also move in the upward and downward directions sliding within the guide column openings and the reinforcing collars 54. Thus, the guide columns 44 provide stability for the cutting tool clamping assembly 48 and prevent the lifting platform 46 from becoming unlevel. Vertical positive stops 56 are attached to a bottom of each guide column 44 to limit the upward motion of the lifting device 50.

Figure 4:
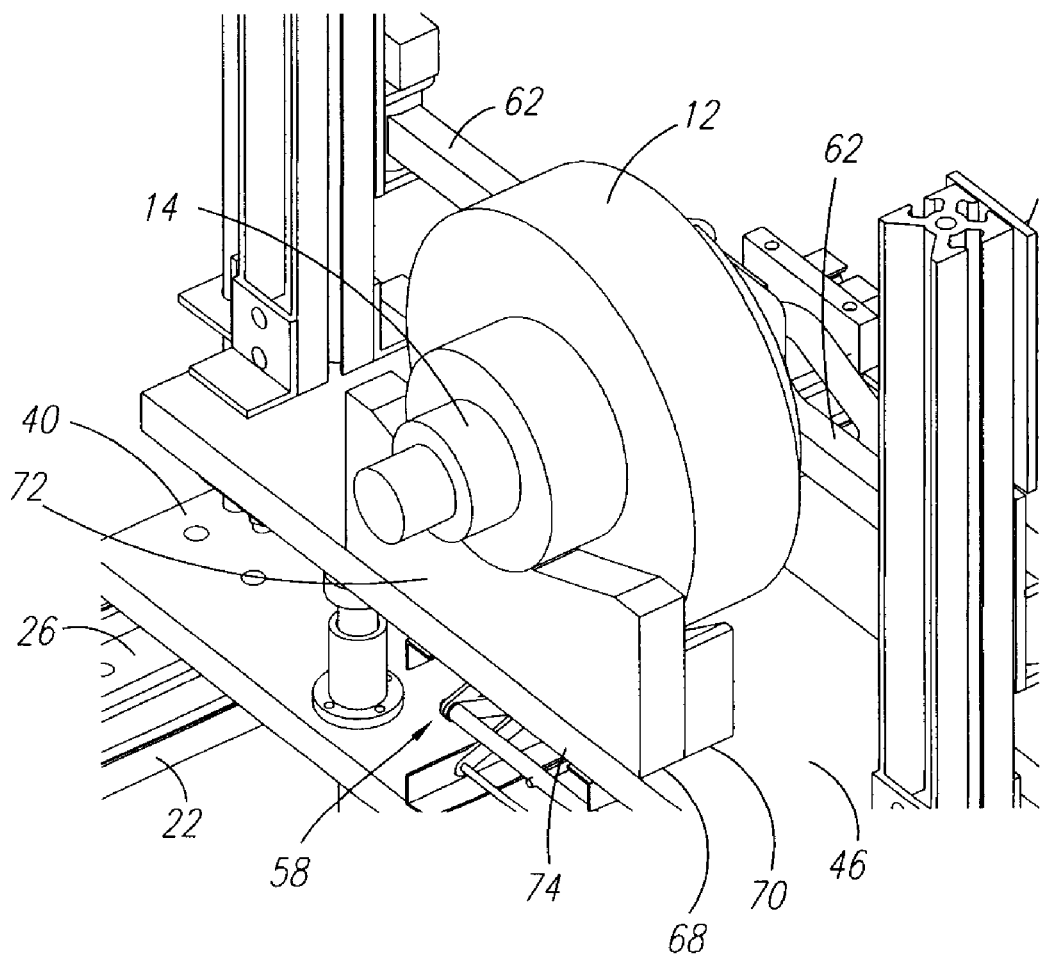
FIG. 4 is a close-up side-rear perspective view of a cutting tool clamping assembly of the cutting tool changing device.
Figure 5:
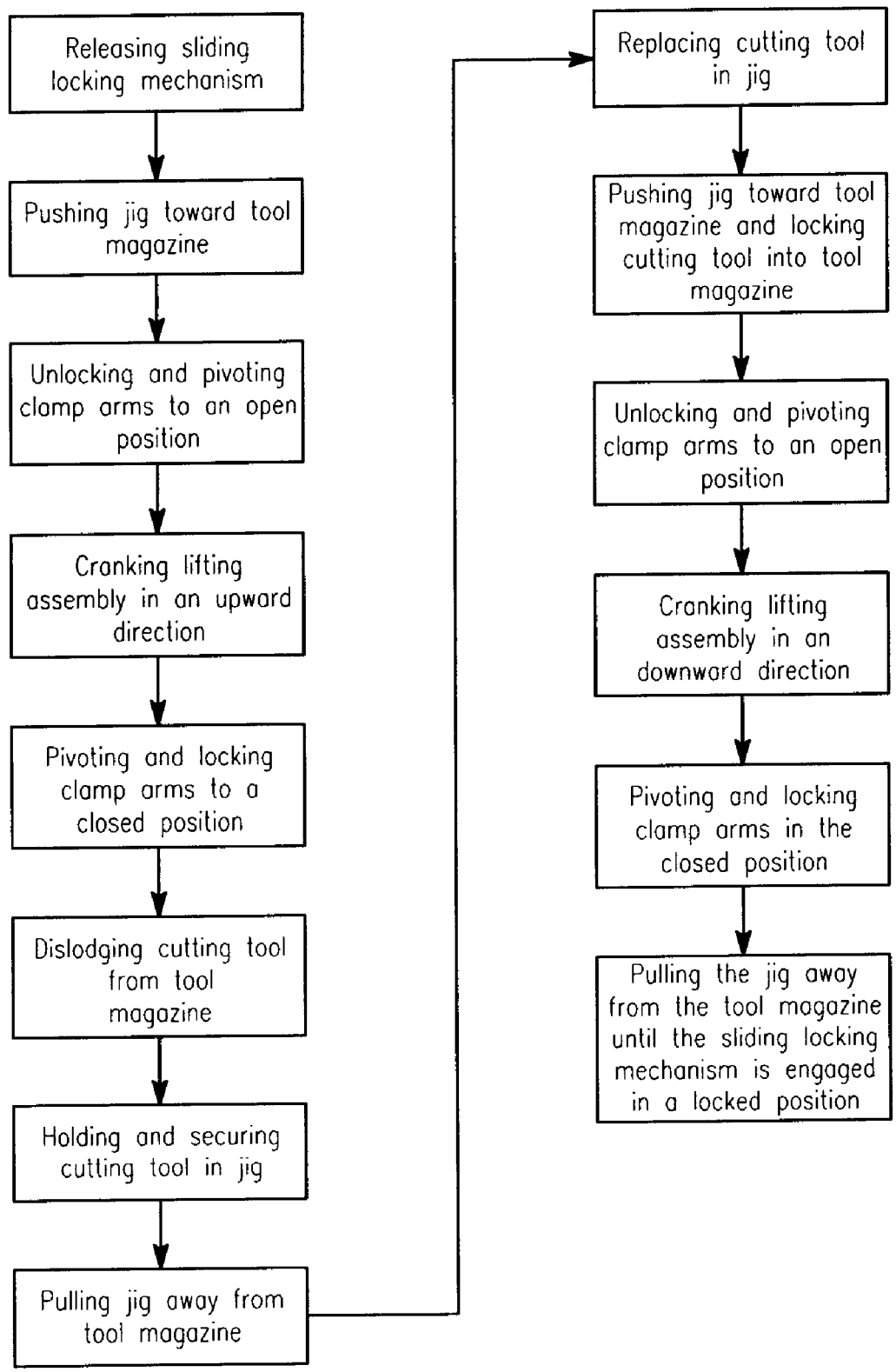
FIG. 5 is a flowchart showing the steps required to change out a cutting tool.

Referring to FIGS. 2B and 4, the cutting tool clamping assembly 48 includes a V-shaped nesting block assembly 58, a pair of vertical support columns 60, a pair of clamp arms 62 with a locking lever 64, and a pair of locking clamps 66. The cutting tool clamping assembly 48 is assembled on a top surface of the lifting platform 46.

The V-shaped nesting block assembly 58 includes a first V-shaped block 68 and a second V-shaped block 70. The first V-shaped block 68 receives a shaft 14 of the cutting tool 12 and the second V-shaped block 70 receives the cutting tool 12, as will be explained further below. Because a diameter of the cutting tool 12 is greater than a diameter of the cutting tool shaft 14, a height of the first V-shaped block 68 is greater than a height of the second V-shaped block 70. The first V-shaped block 68 is mounted to the top surface of the lifting platform 46 such that a rear side 72 of the first V-shaped block 68 is flush with a rear edge 74 of the lifting platform 46, as shown in FIG. 4. The second V-shaped block 70 is mounted to the lifting platform 46 directly in front of the first V-shaped block 68. When mounted, the second V-shaped block 70 may or may not contact the first V-shaped block 68. In other words, when the V-shaped nesting block assembly 58 is mounted, there may or may not be a gap between the first 68 and the second 70 V-shaped blocks. In the embodiment shown in the figures there is no gap between the first 68 and the second 70 V-shaped blocks.

Figure 3:
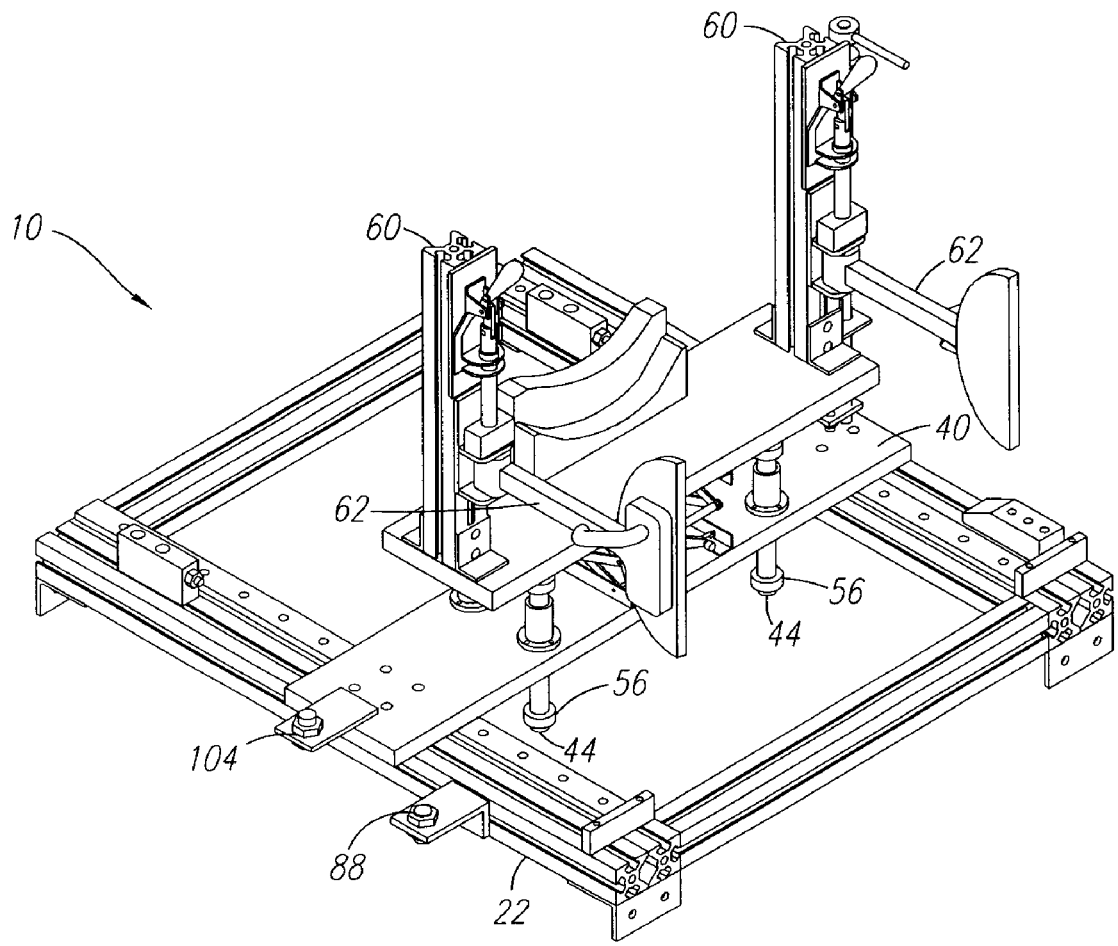
FIG. 3 is a front perspective view from the opposite side of FIG. 2 showing the clamp arms in an open position and the location of a proximity switch.

Referring to FIGS. 2B and 3, the vertical support columns 60 are mounted to the top surface at each end of the lifting platform 46, as shown in FIGS. 2 and 3. The vertical support columns 60 are mounted to the lifting platform 46 with brackets and extend vertically upward from the lifting platform 46.

One clamp arm 62 is pivotally attached to a front side 78 of each vertical support column 60. The clamp arms 62 extend horizontally outward and are, thus, substantially perpendicular to the vertical support columns 60. A holder 80 in the form of a semi-circular shaped disc is attached to a distal end 82 on one side of each clamp arm 62. The holder 80 holds and secures the cutting tool 12 against the first V-shaped block 68, as will be explained further below. A handle 84 is attached to the distal end 82 on the opposite side of each clamp arm 62 to allow the operator to pivot the clamp arms 62 from a closed position, as shown in FIGS. 2A and 2B, to an open position, as shown in FIG. 3, and vice versa. In addition, the handles 84 allow the operator to slide the jig 20 in the forward and backward directions to change out the cutting tool 12.

The locking lever 64 is fixedly attached to the distal end 82 on one of the clamp arms 62. When the clamp arms 62 are in the closed position the locking lever 64 attaches to the distal end 82 of the other clamp arm 62 thereby locking the two clamp arms 62 in the closed position and securing the cutting tool 12 to the V-shaped nesting block assembly 58.

One locking clamp 66 is mounted to the front side 78 of each vertical support column 60 just above the clamp arms 62. The locking clamps 66 lock the clamp arms 62 in place to prevent the clamp arms 62 from swinging or pivoting in the horizontal direction during the changing of the cutting tool 12.

The cutting tool changing device 10 further includes a sliding locking mechanism 86 that works in conjunction with a proximity switch 88. The sliding locking mechanism 86 is attached to a side of one of the vertical support columns 60 via brackets and includes a handle 92 located adjacent to the top of the vertical support column 60 and a first bar 94 that extends down from the handle 92 and through openings defined in each bracket. A horizontal plate 96 is attached to the bottom of the first bar 94 and extends inward toward the support platform 40. A second bar 98 is attached to a distal end of the horizontal plate 96 and extends downward through an opening defined in the support platform 40.

The sliding locking mechanism 86 further includes a locking block 100 that is removably and slidably attached to the top surface 38 of the main support 22. The second bar 98 on the sliding locking mechanism 86 engages an opening 102 defined in the locking block 100 when the jig 20 is in a retracted or stored position to thereby secure the jig 20 during operation of the machining center, as will be explained further below.

Referring to FIG. 3, the proximity switch 88 is located on a side of the main support 22 that is opposite to the main support 22 that includes the locking block 100. A trip dog 104 is attached to the support platform 40 and extends beyond the support platform 40 such that the trip dog 104 engages the proximity switch 88 when the jig 20 is in the retracted position to thereby confirm that the jig 20 is in the stored position.

Referring to FIGS. 1-5, prior to changing out the cutting tool 12 the jig 20 is in the retracted or stored position, which is the position furthest away from the tool magazine 16 and closest to the opening in the machining center. It should be noted, that in this position the lifting device 50 is in a full downward position and the clamp arms 62 are in a closed position.

To change the cutting tool 12 the operator simply disengages the sliding locking mechanism 86 from the locking block 100 by lifting the vertically upward on the handle 92 of the sliding locking mechanism 86. The operator then pushes on the handles 84 on the clamp arms 62 to slide the jig 20 toward the tool magazine 16 until the support platform 40 contacts the rear positive stops 30. The operator then opens the clamp arms 62 and turns the crank handle 52 to move the lifting device 50 in an upward direction until the first 68 and second 70 V-shaped blocks contact the shaft 14 and the cutting tool 12 respectively. The operator then closes the clamp arms 62 and secures them in the closed position with the locking lever 64. The operator then uses a tool pry bar to dislodge the cutting tool 12 from the tool magazine 16. When the cutting tool 12 is dislodged from the tool magazine 16 the cutting tool shaft 14 is resting on the first V-block 68 and the cutting tool 12 is resting on the second V-shaped block 70. When the clamp arms 62 are closed the holder 80 contacts a side of the cutting tool 12 opposite that of the side that the shaft 14 is located, and holds and secures the cutting tool 12 against the first V-shaped block 68. The operator then can pull on the handles 84 on the clamp arms 62 to retract the jig 20 and now easily replace the cutting tool 12.

To reinstall the cutting tool 12, the operator pushes on the handles 84 until the shaft 14 on the cutting tool is engaged and locked into the tool magazine 16. The operator then unlocks and opens the clamp arms 62 and lowers the lifting device 50. After the lifting device 50 is lowered the operator closes and locks the clamp arms 62 and retracts the jig 20 until the sliding locking mechanism 86 engages the locking block 100 to thereby secure the jig 20 safely in the stored position.

While specific embodiments of the invention have been described and illustrated, it is to be understood that these embodiments are provided by way of example only and that the invention is not to be construed as being limited but only by proper scope of the following claims.

What is claimed is:

1. A tool changing device comprising:
    a mounting frame;
    a support platform slidably mounted to the mounting frame;
    a lifting device mounted to the support platform; and
    a tool clamping assembly operatively mounted to the lifting device such that the lifting device moves the tool clamping assembly vertically upward and downward, the tool clamping assembly including:
        a V-shaped nesting block assembly;
        a pair of vertical support columns; and
        a clamp arm pivotally attached to a front side of each vertical support column, each clamp arm including a holder to hold and secure the tool in the V-shaped nesting block assembly.

2. The tool changing device of claim 1 further comprising:
    a lifting platform; and
    multiple guide columns,
    wherein the lifting device is attached to a bottom surface of the lifting platform and the tool clamping assembly is mounted to a top surface of the lifting platform,
    wherein the multiple guide columns are attached to the bottom surface of the lifting platform and extend downward through openings defined in the support platform, and
    wherein the guide columns slide through the openings defined in the support platform when the lifting device moves the tool clamping assembly in the upward and downward directions.

3. The tool changing device of claim 2, wherein the V-shaped nesting block assembly includes a first V-shaped block and a second V-shaped block, wherein the first V-shaped block is mounted to the lifting platform such that a rear side of the first V-shaped block is flush with a rear edge of the lifting platform and wherein the second V-shaped block is mounted to the lifting platform in front of the first V-shaped block.

4. The tool changing device of claim 3, wherein the holders are each attached at a distal end of the respective clamp arm on one side of the respective clamp arm and wherein one of the clamp arms also includes a locking lever attached to the distal end thereof on an opposite side from the holder of the one clamp arm, and wherein when the clamp arms are in a closed position, the holders contact the tool and hold the tool in the V-shaped nesting block assembly.

5. The tool changing device of claim 4, wherein the tool clamping assembly further includes a locking clamp attached to the front side of each vertical support column above the respective clamp arm to prevent the respective clamp arm from pivoting in a horizontal direction.

6. The tool changing device of claim 5 further comprising:
    a sliding lock mechanism operatively attached to a side of one of the vertical support columns; and
    a proximity switch located on the mounting frame near a front portion of the mounting frame,
    wherein when the proximity switch detects that the tool clamping assembly is in a retracted position, the sliding lock mechanism locks the tool clamping assembly in the retracted position.

7. The tool changing device of claim 6 further comprising:
    a front positive stop located at a front portion of the mounting frame to limit the horizontal-forward motion of the support platform;
    a rear positive stop located on a rear portion of the mounting frame to limit the horizontal-rearward motion of the support platform; and
    a vertical positive stop located near a bottom of each guide column to limit the vertical-upward motion of the lifting device.

8. A cutting tool changing device for removing and reinstalling a cutting tool from a tool magazine in a machine center comprising:
    a mounting frame inside the machine center; and
    a tool changing jig slidably mounted to the mounting frame, the tool changing jig including:
        a lifting assembly; and
        a cutting tool clamping assembly operatively mounted to the lifting assembly such that the lifting assembly moves the tool clamping assembly vertically upward and downward, the tool clamping assembly including:
            a V-shaped nesting block assembly;
            a pair of vertical support columns; and
            a clamp arm pivotally attached to a front side of each vertical support column, each clamp arm including a holder to hold and secure the tool in the V-shaped nesting block assembly,
        wherein the tool changing jig horizontally slides in a rearward direction toward the tool magazine and in a forward direction away from the tool magazine to a retracted position.

9. The cutting tool changing device of claim 8 further comprising:
    a lifting platform; and
    multiple guide columns,
    wherein the lifting assembly is attached to a bottom surface of the lifting platform and the tool clamping assembly is mounted to a top surface of the lifting platform, wherein the multiple guide columns are attached to the bottom surface of the lifting platform and extend downward through openings defined in a support platform, and wherein the guide columns slide through the openings defined in the support platform when the lifting assembly moves the tool clamping assembly in the upward and downward directions.

10. The cutting tool changing device of claim 9, wherein the V-shaped nesting block assembly includes a first V-shaped block and a second V-shaped block, wherein the first V-shaped block is mounted to the lifting platform such that a rear side of the first V-shaped block is flush with a rear edge of the lifting platform, wherein the second V-shaped block is mounted to the lifting platform in front of the first V-shaped block, and wherein a height of the first V-shaped block is greater than a height of the second V-shaped block.

11. The cutting tool changing device of claim 10, wherein the holders are each attached at a distal end of the respective clamp arm on one side of the respective clamp arm and wherein one of the clamp arms also includes a locking lever attached to the distal end thereof on an opposite side from the holder of the one clamp arm to secure the clamp arms in a closed position.

12. The cutting tool changing device of claim 11, wherein the cutting tool includes a cutting tool portion and a cutting tool shaft, and when the cutting tool is dislodged from the tool magazine, the cutting tool shaft rests on the first V-shaped block and the cutting tool portion of the cutting tool rests on the second V-shaped block, wherein when the clamp arms are in the closed position, the holders contact a side of the cutting tool portion opposite that of the side that the cutting tool shaft is located, thereby holding and securing the cutting tool portion against the first V-shaped block.

13. The cutting tool changing device of claim 12, wherein the tool clamping assembly further includes a locking clamp attached to the front side of each vertical support column above the respective clamp arm to prevent the respective clamp arm from pivoting in a horizontal direction.

14. The cutting tool changing device of claim 13, wherein the mounting frame includes a pair of main supports and a pair of cross supports, wherein one of the cross supports is attached to an inside portion near a front portion of each main support and the other cross support is attached to the inside portion near a rear portion of each main support, wherein the main supports and the cross supports are substantially perpendicular to each other, and wherein the main supports include mounting feet extending vertically downward from the front portion and the rear portion of the main supports to mount the mounting frame to the machine center.

15. The cutting tool changing device of claim 14 further comprising guide rails attached to a top surface of each main support, wherein the tool changing jig includes the support platform, wherein the support platform extends between the main supports such that the support platform contacts the guide rails, wherein the support platform horizontally slides forward and backward on the guide rails, and wherein the lifting assembly includes a jack and a crank handle whereby the jack is mounted to a top surface of the support platform.

16. The cutting tool changing device of claim 15 further comprising:

a sliding lock mechanism operatively attached to a side of one of the vertical support columns;

a proximity switch located on an outside side surface and near a front portion on one of the main supports on an opposite side of the mounting frame as the sliding lock mechanism; and a trip dog attached to an end portion of the support platform, wherein the trip dog extends past the end of the support platform such that the trip dog engages the proximity switch when the tool changing jig is in the retracted position, and wherein when the proximity switch detects that the tool changing jig is in a retracted position, the sliding lock mechanism locks the tool clamping assembly in the retracted position.

17. The cutting tool changing device of claim 16 further comprising:

a front positive stop located at a front portion of each main support to limit the horizontal-forward motion of the support platform;

a rear positive stop located on a rear portion of each main support to limit the horizontal-rearward motion of the support platform; and a vertical positive stop located near a bottom of each guide column to limit the vertical-upward motion of the lifting assembly.

* * * * *